(12) United States Patent
Jiang et al.

(10) Patent No.: US 11,665,751 B2
(45) Date of Patent: May 30, 2023

(54) SIGNAL TRANSMISSION METHOD AND NETWORK DEVICE

(71) Applicant: VIVO MOBILE COMMUNICATION CO., LTD., Chang'an Dongguan (CN)

(72) Inventors: Lei Jiang, Chang'an Dongguan (CN); Kai Wu, Chang'an Dongguan (CN); Zhi Lu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/981,547

(22) PCT Filed: Feb. 15, 2019

(86) PCT No.: PCT/CN2019/075187
§ 371 (c)(1),
(2) Date: Sep. 16, 2020

(87) PCT Pub. No.: WO2019/179262
PCT Pub. Date: Sep. 26, 2019

(65) Prior Publication Data
US 2021/0022191 A1    Jan. 21, 2021

(30) Foreign Application Priority Data

Mar. 23, 2018 (CN) .......................... 201810247303.1

(51) Int. Cl.
*H04W 74/08* (2009.01)
*H04W 56/00* (2009.01)

(52) U.S. Cl.
CPC ..... *H04W 74/0891* (2013.01); *H04W 56/001* (2013.01); *H04W 74/0816* (2013.01)

(58) Field of Classification Search
CPC ......... H04W 74/0891; H04W 74/0816; H04W 74/0808; H04W 74/08; H04W 74/085; H04W 74/006; H04W 56/001; H04L 27/0006; H04L 5/0008; H04L 5/0094
See application file for complete search history.

(56) References Cited

U.S. PATENT DOCUMENTS

| 2017/0171759 A1 | 6/2017 | Li et al. |
| 2017/0188294 A1 | 6/2017 | Xu et al. |
| 2017/0195889 A1 | 7/2017 | Takeda et al. |

(Continued)

FOREIGN PATENT DOCUMENTS

| CN | 104333873 A | 2/2015 |
| CN | 105491641 A | 4/2016 |

(Continued)

OTHER PUBLICATIONS

International Search Report & Written Opinion related to Application No. PCT/CN2019/075187; dated Oct. 8, 2020.

(Continued)

*Primary Examiner* — Sudesh M Patidar
(74) *Attorney, Agent, or Firm* — von Briesen & Roper, s.c.

(57) ABSTRACT

A signal transmission method and a network device are provided. The method is applied to the network device and includes: performing LBT for a channel in an SSB transmission direction before a transmission of an SSB in an unlicensed band; and transmitting the SSB when the channel is detected as idle.

15 Claims, 4 Drawing Sheets

(56) References Cited

U.S. PATENT DOCUMENTS

| | | | |
|---|---|---|---|
| 2018/0084593 A1 | 3/2018 | Chen et al. | |
| 2018/0115996 A1* | 4/2018 | Si | H04W 74/0808 |
| 2019/0037509 A1* | 1/2019 | Li | H04W 56/001 |
| 2019/0200389 A1* | 6/2019 | Li | H04W 72/0453 |
| 2019/0230706 A1* | 7/2019 | Li | H04W 88/08 |
| 2019/0246410 A1* | 8/2019 | Zhang | H04W 74/0891 |
| 2020/0022185 A1* | 1/2020 | Luo | H04W 56/001 |
| 2020/0084804 A1* | 3/2020 | Zhang | H04W 56/001 |
| 2020/0322974 A1* | 10/2020 | Noh | H04L 5/14 |
| 2020/0344802 A1* | 10/2020 | Tang | H04L 5/0091 |

FOREIGN PATENT DOCUMENTS

| | | |
|---|---|---|
| CN | 105577339 A | 5/2016 |
| CN | 106161317 A | 11/2016 |
| CN | 106538013 A | 3/2017 |
| CN | 107528682 A | 12/2017 |
| EP | 3595371 A1 | 1/2020 |
| WO | 2019036231 A1 | 2/2019 |
| WO | 2019143937 A1 | 7/2019 |

OTHER PUBLICATIONS

Chinese Office Action for related Chinese Application No. 201810247303.1; dated Oct. 12, 2020.

VIVO, "Design considerations for standalone operation in NR unlicensed spectrum", Feb. 26-Mar. 2, 2018, 3GPP TSG RAN WG1 Meeting #92, Athens, Greece.

Nokia, Nokia Shanghai Bell, "Potential solutions and techniques for NR unlicensed", Feb. 26-Mar. 2, 2018, 3GPP TSG RAN WG1 Meeting #92, Athens, Greece.

Extended European Search Report for related Application No. 19771341.5; dated Apr. 12, 2021.

VIVO, "Potential solutions and techniques for NR unlicensed spectrum", Feb. 26-Mar. 2, 2018, 3GPP TSG RAN WG1 Meeting #92, Athens, Greece.

Spreadtrum Communications, "Discussion on SS/PBCH block in NR unlicensed", Feb. 26-Mar. 2, 2018, 3GPP TSG RAN WG1 Meeting #92, Athens, Greece.

Spreadtrum Communications, "Considerations on the LBT procedures for NR unlicensed band", Feb. 26-Mar. 2, 2018, 3GPP TSG RAN WG1 Meeting #92, Athens, Greece.

Interdigital Inc., "Considerations on Synchronization Signal for NR Unlicensed", Feb. 26-Mar. 2, 2018, 3GPP TSG RAN WG1 Meeting #92, Athens, Greece.

Canadian Search Report for related Application No. 3,094,552; dated Dec. 6, 2022.

Harmonized European Standard, "Broadband Radio Access Networks (BRAN); 5 GHz high performance RLAN; Harmonized EN covering the essential requirements of article 3.2 of the R&TTE Directive", Jun. 2012, ETSI EN 301 893 V1.7.1, <https://www.etsi.org/deliver/etsi_en/301800_301899/301893/01.07.01_60/en_301893v010701p.pdf>.

* cited by examiner

Fig.1

| SSB(15kHZ) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | DL | DL | SSB1 | | | | | SSB2 | | | | GP | UL |

Fig.2

| SSB(30kHZ) | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|---|---|---|---|---|---|---|---|---|---|---|---|
| | DL | DL | DL | | SSB1 | | | | SSB2 | | | GP | UL | DL | DL | | | SSB3 | | | | SSB4 | | | GP | GP | UL | UL |

Fig.3

| SSB(30kHZ) | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|---|---|---|---|---|---|---|---|---|---|---|---|
| | DL | DL | | SSB1 | | | | | SSB2 | | | GP | UL | DL | DL | | | SSB3 | | | | | SSB4 | | | GP | UL |

Fig.4

| SSB(120kHZ) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | DL | DL | | SSB1 | | | | SSB2 | | | | SSB3 | | SSB4 | GP | UL |

Fig.5

| SSB(240kHZ) | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|---|---|---|---|---|---|---|---|---|---|---|---|---|
| | D | D | D | D | D | L | L | L | L | L | SSB1 | SSB2 | SSB3 | SSB4 | G P | G U P P | U U P P | D D L L | D D L L | D L | L | L | SSB5 | SSB6 | SSB7 | SSB8 | G G G G P P P P | U U P P | U U L L | U U L L |

SIGNAL TRANSMISSION METHOD AND NETWORK DEVICE

CROSS-REFERENCE TO RELATED APPLICATION

This patent application is a 35 USC § 371 U.S. national stage of International Application No. PCT/CN2019/075187 filed on Feb. 15, 2019, which claims a priority to Chinese Patent Application No, 201810247301.1 filed on Mar. 23, 2018, which are incorporated herein by reference in their entirety.

TECHNICAL FIELD

The present disclosure relates to the field of communications technology, in particular to a signal transmission method and a network device.

BACKGROUND

In future communications systems, operators may use unlicensed bands (unlicensed band), as a supplement to licensed bands (licensed band), to augment their services. In order to maintain consistency with new radio (New Radio, NR) deployment and increase NR-based unlicensed accesses as much as possible, unlicensed bands may operate at 5 GHz, 37 GHz and 60 GHz frequency bands. Large bandwidths (80 MHz or 100 MHz) of unlicensed bands may reduce implementation complexities of base station and user equipment (User Equipment, UE) (also known as terminal). Since unlicensed bands are shared by a variety of radio access technologies (Radio Access Technologies, RATs), such as wireless fidelity (Wireless Fidelity, Wifi), radar, and long term evolution licensed-assisted access (Long Term Evolution Licensed-Assisted Access, LTE LAA), the usage of unlicensed bands has to abide by certain regulations (regulation) in some countries or jurisdictions, to ensure a fair access to the resources for all devices. The regulations include, for example: performing listening to the channel firstly before transmission, that is, listen before talk (Listen Before Talk, LBT), maximum channel occupancy time (Maximum Channel Occupancy Time, MCOT), and the like.

In NR communications systems, for the purposes of initial access, radio resource management (Radio Resource Management, RRM) measurement and the like, it is necessary for a base station (i.e., gNB) to transmit synchronization signal blocks (Synchronization Signal Blocks, SSBs) to be measured and evaluated by UE. An SSB is composed of a new radio primary synchronization signal (New Radio Primary Synchronization Signal, NR-PSS)/new radio secondary synchronization signal (New Radio Secondary Synchronization Signal, NR-SSS) and a new radio physical broadcast channel (New Radio Physical Broadcast Channel, NR-PBCH). SSBs are transmitted by the base station periodically. For connected/idle and non-standalone (non-standalone) cases (case), the SSB periodicity may be configured as {5, 10, 20, 40, 80, 160} ms. Regardless of the periodicity, SSBs in the SS burst set (SS burst set) must be transmitted within a time window of 5 ms.

The aforementioned SSB transmission mechanism is applicable to licensed bands where the base station may transmit SSBs periodically. However, in unlicensed bands, the transmission of SSBs cannot be guaranteed due to channel uncertainty.

For high frequency SSB transmission, only a single beam direction can be transmitted at a same time, since it is based on analog beamforming. If LBTs have been performed for multiple SSB transmission directions, during transmission of an SSB, the base station cannot occupy a channel for SSB transmitted subsequently. As a result, the channel may be occupied by another RAT or transmission node.

SUMMARY

The embodiments of the present disclosure provides a signal transmission method and a network device, to solve the problem in high frequency SSB transmission that, if LBTs have been performed for multiple SSB transmission directions, during transmission of one or more previous SSBs by the base station, the base station cannot occupy a channel for SSB transmitted subsequently, and consequently the channel may be occupied by another RAT or transmission node.

In a first aspect, the present disclosure provides, in some embodiments, a signal transmission method. The method is applied to a network device and includes:

performing LBT for a channel in an SSB transmission direction before a transmission of an SSB in an unlicensed band;

transmitting the SSB when the channel is detected as idle.

In a second aspect, the present disclosure further provides, in some embodiments, a network device, including:

an LBT module, configured to perform LBT for a channel in an SSB transmission direction before a transmission of an SSB in an unlicensed band;

a transmission module, configured to transmit the SSB when the channel is detected as idle.

In a third aspect, the present disclosure further provides, in some embodiments, a network device, including a memory, a processor and a computer program stored in the memory and configured to be executed by the processor, wherein the processor is configured to execute the computer program, to implement steps of the foregoing signal transmission method.

In a fourth aspect, the present disclosure further provides, in some embodiments, a computer readable storage medium storing therein a computer program, wherein the computer program is configured to be executed by a processor, to implement steps of the foregoing signal transmission method.

Embodiments of the present disclosure have the following beneficial effects: by performing LBT for a channel in an SSB transmission direction before a transmission of an SSB in an unlicensed band and transmitting the SSB when the channel is detected as idle, LBT for each SSB can be achieved prior to its transmission, thereby improving reliability of SSB transmission.

BRIEF DESCRIPTION OF THE DRAWINGS

To better clarify technical solutions in embodiments of the present disclosure or in the related art, drawings used in description of the embodiments or the related art are briefly introduced hereinafter. Apparently, the described drawings merely illustrate some of the disclosed embodiments. A person of ordinary skill in the art can obtain other drawings based on the described drawings without any creative efforts.

DETAILED DESCRIPTION

The technical solutions in the embodiments of the present disclosure are clearly and thoroughly described below with reference to the accompanying drawings of the embodiments of the present disclosure. Apparently, the described embodiments are some embodiments of the present disclosure, but are not all the embodiments. Based on the embodiments of the present disclosure, all other embodiments derived by a person of ordinary skill in the art without any creative efforts shall fall within the scope of the present disclosure.

Terms "first", "second" and the like in the specification and claims of the present disclosure are adopted not to describe a specific sequence or order but to distinguish similar objects. It should be understood that data used like this may be interchanged under a proper condition for implementation of the embodiments of the disclosure described here in a sequence apart from those shown or described here. In addition, terms "include" and "have" and any variant thereof are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment. Further, term "and/or" as used in the specification and claims is intended to represent at least one of objects connected by the term. For example, A and/or B represents three cases, namely, only A exists, only B exists, and both A and B exist.

In embodiments of the present disclosure, expressions such as "exemplary" or "for example" are used to represent an example, illustration or description. Any embodiment or design scheme described with such expression as "exemplary" or "for example" shall not be construed as being more advantageous than other embodiment or design scheme. In specific, expressions such as "exemplary" or "for example" are intended to demonstrate a related concept in a specific manner.

Embodiments of the present disclosure are described hereinafter with reference to accompanying drawings. The signal transmission method and the network device provided in embodiments of the present disclosure are applicable to a wireless communications system, which may be a system employing $5^{th}$ generation ($5^{th}$ Generation, 5G) mobile communications technology (hereinafter, referred to as 5G system). It is appreciated by those skilled in the art, the 5G NR system is merely an example and is not intended to impose any limitation.

Before embodiments of the present disclosure are described, some concepts used in the descriptions are explained first.

Figure 1:
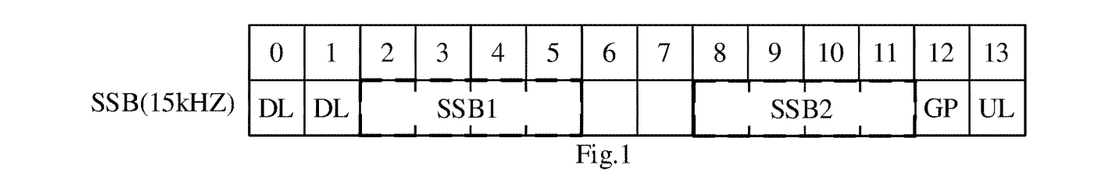
FIG. 1 is a schematic diagram of an SSB pattern for sub-carrier spacing of 15 kHz.
Figure 2:
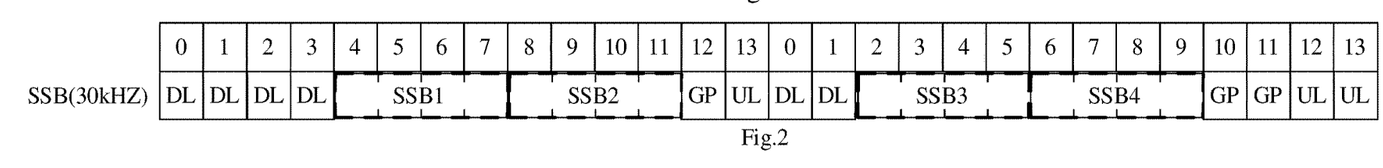
FIG. 2 is a first schematic diagram of a SSB pattern for sub-carrier spacing of 30 kHz.
Figure 3:
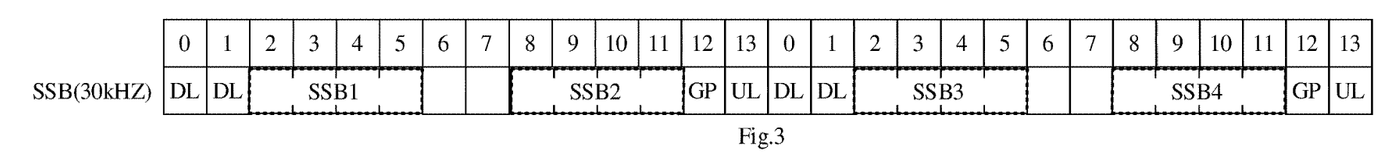
FIG. 3 is a second schematic diagram of a SSB pattern for sub-carrier spacing of 30 kHz.
Figure 4:
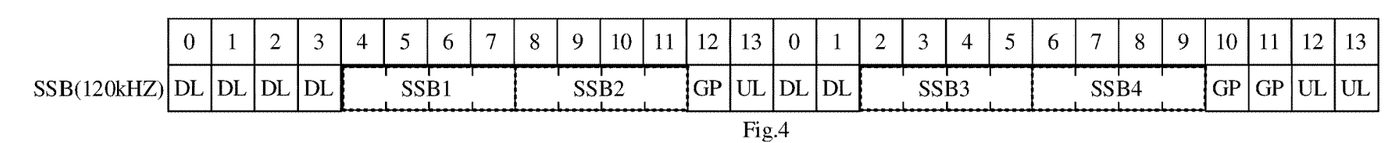
FIG. 4 is a schematic diagram of an SSB pattern for sub-carrier spacing of 120 kHz.
Figure 5:
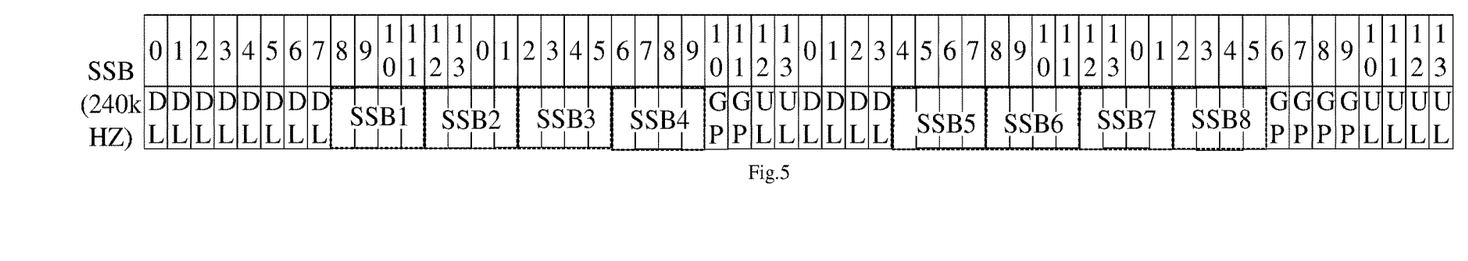
FIG. 5 is a schematic diagram of an SSB pattern for sub-carrier spacing of 240 kHz.

For low frequency bands (that is, frequency bands lower than 6 GHz), sub-carrier spacing for SSB may be 15 kHz/30 kHz, at least one or two initial symbols in a slot (slot) composed of 14 symbols (symbol) are preserved for downlink (Downlink, DL) control, and at least two final symbols in the slot are preserved (preserve) for guard period (Guard Period, GP) and uplink (Uplink, UL) control. There are at most two possible SSB time locations (time location) in a slot with 14 symbols. For high frequency bands (that is, frequency bands higher than 6 GHz), sub-carrier spacing for SSB is 120 kHz/240 kHz. When sub-carrier spacing for SSB is 120 kHz, at least two initial symbols in a slot composed of 14 symbols are preserved for DL control, and at least two final symbols in the slot are preserved for GP and UL control. There are at most two possible SSB time locations in a slot with 14 symbols. When sub-carrier spacing for SSB is 240 kHz, an SSB is mapped to two consecutive slots each with 14 symbols. At least four initial symbols in the first slot are preserved for DL control, and at least four final symbols in the second slot are preserved for GP and UL control. There are at most four possible SSB time locations in two consecutive slots each with 14 symbols. SSB transmission patterns (pattern) in the related art are illustrated in FIG. 1 through FIG. 5, wherein FIG. 1 is a schematic diagram of an SSB pattern for sub-carrier spacing of 15 kHz; FIG. 2 is a first schematic diagram of a SSB pattern for sub-carrier spacing of 30 kHz; FIG. 3 is a second schematic diagram of a SSB pattern for sub-carrier spacing of 30 kHz; FIG. 4 is a schematic diagram of an SSB pattern for sub-carrier spacing of 120 kHz; and FIG. 5 is a schematic diagram of an SSB pattern for sub-carrier spacing of 240 kHz. Different SSBs may be transmitted on different direction by using beamforming (beamforming). Each SSB corresponds to one beam (beam) which may also be referred to as spatial domain transmission filter (spatial domain transmission filter).

For high frequency unlicensed bands, it is necessary for a transmission node to perform LBT for a duration of multiple clear channel assessment (Clear Channel Assessment, CCA) slots before accessing a channel, wherein each CCA slot is 5 us. A number of CCA slots is a random number less than or equal to 127. If the result of CCA channel detection is idle, transmission starts after a defer of 8 us. As a result, the entire extended CCA (extended CCA) duration is 8 us+random (0 to 127)×5 us.

Figure 6:
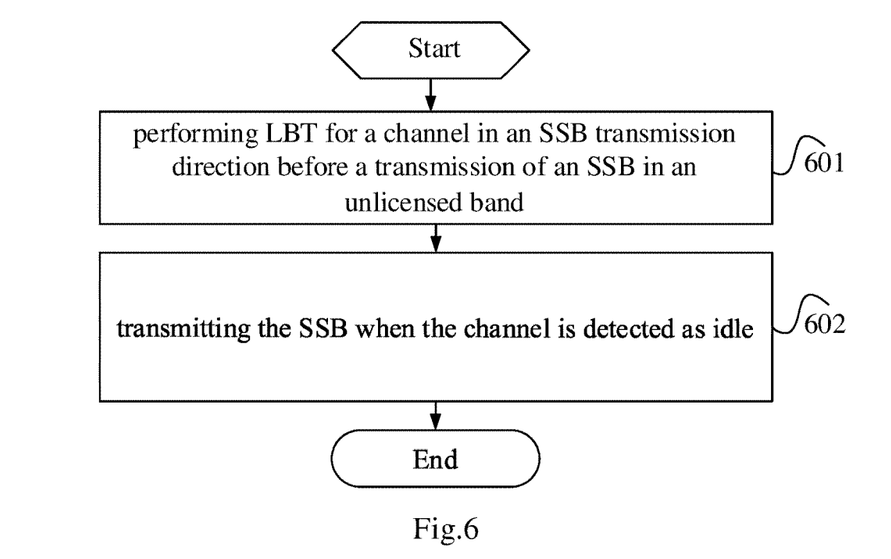
FIG. 6 is a schematic flow diagram of a signal transmission method according to an embodiment of the present disclosure.

Specifically, referring to FIG. 6, a schematic flow diagram of a signal transmission method according to an embodiment of the present disclosure is illustrated. The signal transmission method is applied to a network device and includes:

a step 601: performing LBT for a channel in an SSB transmission direction before a transmission of an SSB in an unlicensed band; and a step 602: transmitting the SSB when the channel is detected as idle.

It is noted, in the step 602, when the channel is detected as idle, the SSB is transmitted to UE.

In embodiments of the present disclosure, by performing, before a transmission of each SSB, LBT for a transmission direction of the SSB, reliability of SSB transmission is improved.

It is noted, a specific implementation of the step of performing LBT for a channel in an SSB transmission direction may be:

performing LBT for a channel in the SSB transmission direction for a target duration, wherein the target duration is determined in one of following manners:

the target duration is equal to a CCA (CCA) duration; or the target duration is acquired according to following formula: target duration=defer duration+random (0, M)×N, wherein M is a maximum number of CCAs and a positive integer less than 127, N is a CCA duration, and random (0, M) is a random number between 0 and M.

In consideration of relatively short actual duration of SSB transmission, LBT of one CCA (i.e., one shot LBT) may reasonably improve the probability of success SSB transmission. In other words, LBT of a 5 us duration is performed, and if a channel is idle, SSB is transmitted. For high frequency bands, transient time (transient time) of network device is less than 10 us. Thus, 15 us are preserved as the LBT and transient time of the network device.

Further, if a LBT mechanism in which LBT has a duration of multiple CCA slots is employed, in consideration of actual channel occupancy time of each SSB, a maximum value of contention window (i.e., the aforementioned maximum number M of CCAs) may be reduced significantly, for example, it may be reduced from 127 down to 7 or 3. If the maximum value of contention window is 3, approximately 35 us should be preserved as the LBT and transient time of the network device.

In embodiments of the present disclosure, generally two different approaches are adopted to implement LBT for each SSB prior to its transmission. One approach is to modify SSB transmission patterns in the related art. The other approach is to limit SSB transmission opportunity, without modifying SSB transmission patterns in the related art.

The specific implementations according to these two approaches in embodiments of the present disclosure are described in detail hereinafter.

The first approach: modifying SSB transmission patterns in the related art

According to this approach, the step 601 is implemented as follows:

performing LBT for a channel in the SSB transmission direction by using a gap orthogonal frequency division multiplex (Orthogonal Frequency Division Multiplex, OFDM) symbol, wherein the gap OFDM symbol is between two adjacent SSBs.

It is noted, a number of gap OFDM symbols between different SSBs may vary.

It is noted, for SSB patterns of high frequency bands, a gap (gap) is added between two consecutive SSBs. If one shot LBT is adopted, when sub-carrier spacing is 120 kHz, at least two OFDM symbols before an SSB are preserved as LBT time; when sub-carrier spacing is 240 kHz, at least four OFDM symbols before an SSB are preserved as LBT time.

Figure 7:
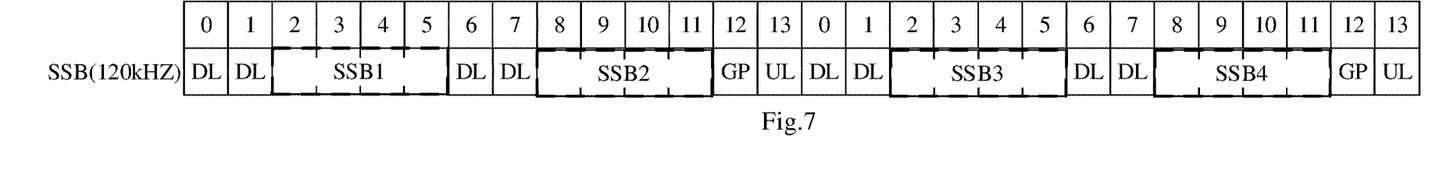
FIG. 7 is a first schematic diagram of a modified SSB pattern for sub-carrier spacing of 120 kHz.
Figure 8:
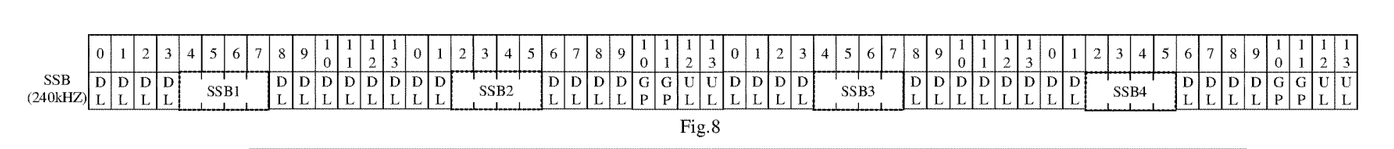
FIG. 8 is a first schematic diagram of a modified SSB pattern for sub-carrier spacing of 240 kHz.

FIG. 7 is a schematic diagram of a modified SSB pattern for sub-carrier spacing of 120 kHz. As shown in FIG. 7, in this case, there is a gap of at least two OFDM symbols between every two SSBs. FIG. 8 is a schematic diagram of a modified SSB pattern for sub-carrier spacing of 240 kHz. As shown in FIG. 8, in this case, there is a gap of at least four OFDM symbols between every two SSBs.

For sub-carrier spacing of 30 kHz, SSB patterns may modified with reference to the modification made in the case that sub-carrier spacing is 120 kHz.

Figure 9:
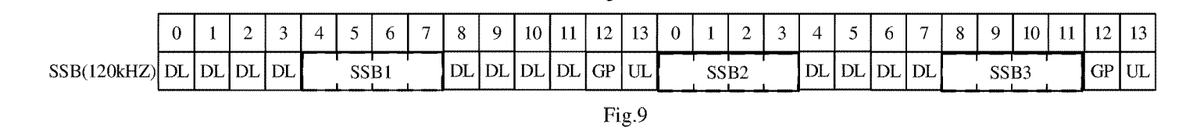
FIG. 9 is a second schematic diagram of a modified SSB pattern for sub-carrier spacing of 120 kHz.
Figure 10:
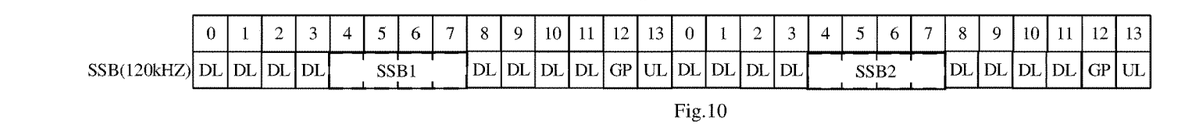
FIG. 10 is a third schematic diagram of a modified SSB pattern for sub-carrier spacing of 120 kHz.
Figure 11:
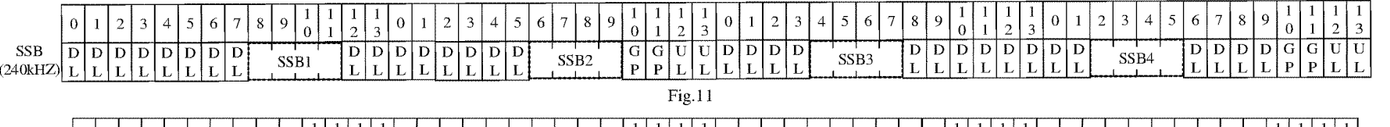
FIG. 11 is a second schematic diagram of a modified SSB pattern for sub-carrier spacing of 240 kHz.
Figure 12:
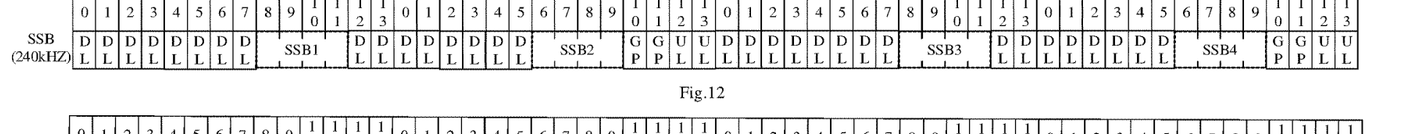
FIG. 12 is a third schematic diagram of a modified SSB pattern for sub-carrier spacing of 240 kHz.

For SSB patterns of high frequency bands, a gap (gap) is added between two consecutive SSBs. If a LBT mechanism in which LBT has a duration of multiple CCA slots is employed, assuming the maximum value of contention window (contention window) is 3, when sub-carrier spacing is 120 kHz, at least four OFDM symbols before an SSB are preserved as LBT time; when sub-carrier spacing is 240 kHz, at least eight OFDM symbols before an SSB are preserved as LBT time. FIG. 9 and FIG. 10 are schematic diagrams of modified SSB patterns for sub-carrier spacing of 120 kHz, in this case, there is a gap of at least four OFDM symbols between every two SSBs. FIG. 11 and FIG. 12 are schematic diagrams of modified SSB patterns for sub-carrier spacing of 240 kHz, in this case, there is a gap of at least eight OFDM symbols between every two SSBs.

Figure 13:
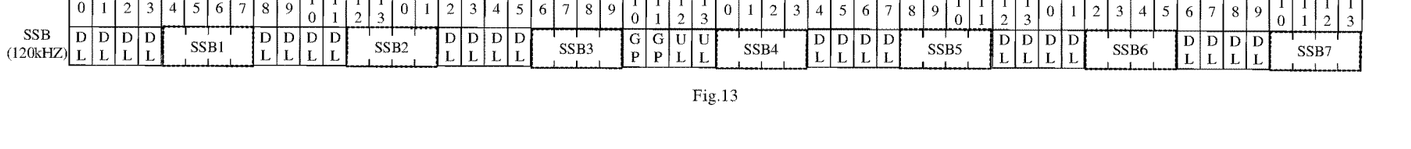
FIG. 13 is a fourth schematic diagram of a modified SSB pattern for sub-carrier spacing of 120 kHz.

It is noted, when sub-carrier spacing is 120 kHz, the designs in FIG. 9 and FIG. 10 cannot allow for the transmission of 64 SSBs in a 5 ms window. One solution is to defer SS block based RRM measurement timing configuration (SS block based RRM Measurement Timing Configuration, SMTC) as needed. Another solution is to design a SSB pattern according to a periodicity of four slots, and transmit 7 SSBs every four slots. Four OFDM symbols are preserved for LBT between every two SSBs. For a specific design of SSB pattern, refer to FIG. 13.

It is noted, the SSB pattern is not limited to those shown above. Any SSB pattern design with gap between any two SSBs shall fall within the scope of embodiments of the present disclosure, wherein the gap between any two SSBs is LBT time.

The second approach: limiting SSB transmission opportunity, without modifying SSB transmission patterns in the related art According to this approach, if there are at least two consecutive SSBs, the step 601 is implemented as follows:

performing LBT for a channel in a transmission direction of a first SSB of the at least two SSBs;

performing LBT for a channel in a transmission direction of a second SSB of the at least two SSBs by using an OFDM symbol of the first SSB if the channel in the transmission direction of the first SSB is detected as busy;

transmitting the first SSB in the OFDM symbol of the first SSB and not transmitting the second SSB in the OFDM symbol of the second SSB if the channel in the transmission direction of the first SSB is detected as idle, wherein the second SSB is after the first SSB and is adjacent to the first SSB.

It is noted, if there are two consecutive SSBs to be transmitted, LBT is performed for the first SSB initially; if a channel in the transmission direction of the first SSB is idle, the first SSB is transmitted, without transmitting the second SSB; if a channel in the transmission direction of the first SSB is busy, this indicates that the first SSB cannot be transmitted, and then OFDM symbols supposed to transmit the first SSB are used to perform LBT for a channel in a transmission direction of the second SSB; if a channel in the transmission direction of the second SSB is idle, the second SSB is transmitted by using OFDM symbols for the second SSB.

It is further noted, when there are at least three consecutive SSBs, if the result of LBT is a channel in the transmission direction of the first SSB is idle, in order to ensure LBT for the third SSB prior to its transmission, LBT for a transmission direction of the third SSB of the at least two SSBs should be performed at this time in the OFDM symbols for the second SSB, wherein the third SSB is after the second SSB and is adjacent to the second SSB.

In this case, the intermediary SSB among three consecutive SSBs is no longer transmitted, so as to ensure that an SSB will not be transmitted if no LBT is performed for the SSB, and LBT is performed for each SSB prior to its transmission.

In this approach, SSB transmission in unlicensed spectrum is primarily achieved by limiting transmission of SSB, without modifying high frequency SSB transmission patterns in the related art. When sub-carrier spacing is 120 kHz, only one SSB can be transmitted in each slot; when sub-carrier spacing is 240 kHz, at most two SSBs can be transmitted in every two slots.

Figure 14:
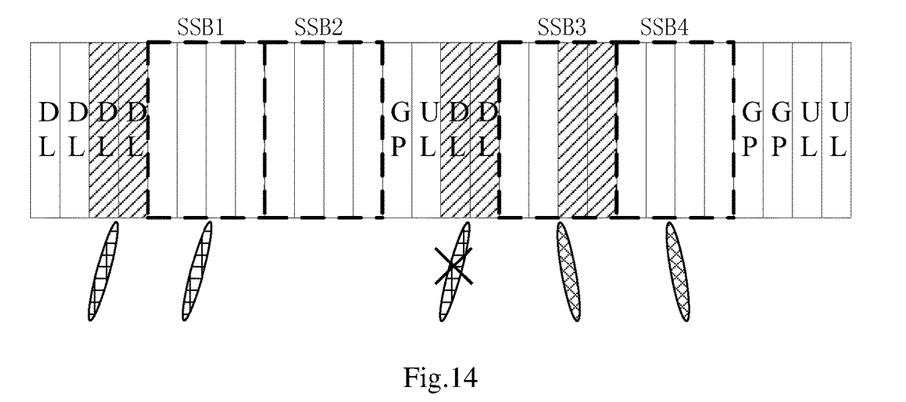
FIG. 14 is a schematic diagram showing SSB transmission.

When sub-carrier spacing is 120 kHz, LBT is preferentially performed for a transmission direction of the first SSB in the slot; if a channel is idle, the first SSB is transmitted and the transmission of the second SSB is skipped. If a channel in the transmission direction of the first SSB is not idle, LBT is performed for a transmission direction of the second SSB in the OFDM symbols for the first SSB, and if a channel is idle, the second SSB is transmitted. A detailed transmission pattern is as shown in FIG. 14, in which boxes filled with oblique lines represent possible LBT OFDM symbols.

When sub-carrier spacing is 240 kHz, if one shot LBT is adopted, SSBs that can be transmitted sequentially are the first SSB, the third/fourth SSB in two slots, or the first/second SSB, the fourth SSB in two slots. Four OFDM symbols between the two SSBs are LBT time. As can be seen in FIG. 14, if a channel on a transmission direction of the first SSB is idle, the first SSB is transmitted, and then LBT is performed on a channel on a transmission direction of the third SSB in the OFDM symbols for the second SSB. If the channel is idle, the third SSB is transmitted; if the channel is busy, LBT is performed on a channel on a transmission direction of the fourth SSB in the OFDM symbols for the third SSB. If the channel in the transmission direction of the first SSB is busy, LBT is performed on a channel on a transmission direction of the second SSB in the OFDM symbols for the first SSB, and if the channel is idle, the second SSB is transmitted. Then, LBT is performed on a channel on a transmission direction of the fourth SSB in the OFDM symbols for the third SSB, and so on, until SSB transmission is completed.

When sub-carrier spacing is 240 kHz, if a LBT mechanism in which LBT has a duration of multiple CCA slots is employed, and the maximum value of contention window is 3, SSBs that can be transmitted sequentially are the first SSB, the fourth SSB in two slots. At least eight OFDM symbols are preserved as LBT time for each SSB.

If several consecutive SSBs have the same transmission direction, only a single LBT for the transmission direction performed before the first SSB is required. If a channel is idle, all the consecutive SSBs may be transmitted. If a channel is not idle, LBT is performed before other SSB sequentially.

It is further noted, since SSB transmission is not guaranteed in unlicensed bands, in some embodiments of the present disclosure, the network device may refrain from transmitting the index of SSB transmitted by the network device, so as not to indicate SSB index.

Specifically, in order not to transmit the index of SSB transmitted by the network device, one of the following two manners may be adopted:

1. remaining minimum system information (Remaining Minimum System Information, RMSI) transmitted by the network device does not carry the index of the SSB transmitted by the network device;

2. an information element (Information Element, IE) associated with the index of the SSB transmitted by the network device is not included in a protocol.

It is noted, the first manner represents that the IE associated with the index of the SSB transmitted by the network device is included in a protocol, and the network device may autonomously choose not to carry SSB index in RMSI when transmitting RMSI, or the protocol may stipulate under this circumstance that the network device is not to carry SSB index in RMSI when transmitting RMSI. The second manner represents that the IE field associated with the SSB index is not included in a technical specification when the specification is finalized. In a specific implementation, the IE field associated with the SSB index may be deleted from a protocol in the related art. In this way, the network device may be prevented from transmitting SSB index fundamentally. The above two manners may be selected based on the actual application.

Embodiments of the present disclosure solve the problem of SSB transmission in unlicensed bands, such that LBT is performed for each SSB prior to its transmission, thereby improving the reliability of SSB transmission, and enhancing accuracy of UE RRM measurement and initial access.

Figure 15:
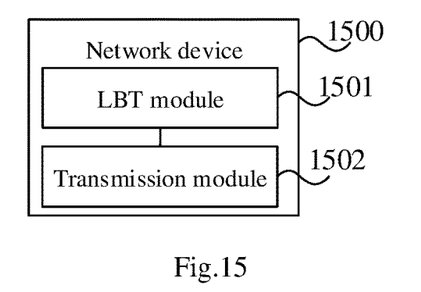
FIG. 15 is a schematic modular diagram of a network device according to an embodiment of the present disclosure.

As shown in FIG. 15, the present disclosure further provides, in an embodiment, a network device 1500, including:

an LBT module 1501, configured to perform LBT for a channel in an SSB transmission direction before a transmission of an SSB in an unlicensed band; and a transmission module 1502, configured to transmit the SSB when the channel is detected as idle.

Further, the LBT module 1501 is configured to:
perform LBT for a channel in the SSB transmission direction for a target duration,
wherein the target duration is determined in one of following manners:
the target duration is equal to a CCA duration; or
the target duration is acquired according to following formula: target duration=defer duration+random (0,M)×N, wherein M is a maximum number of CCAs and a positive integer less than 127, N is a CCA duration, and random (0,M) is a random number between 0 and M.

Further, the LBT module 1501 is configured to:
perform LBT for a channel in the SSB transmission direction by using a gap OFDM symbol, wherein the gap OFDM symbol is between two adjacent SSBs.

Optionally, if there are at least two consecutive SSBs, the LBT module 1501 includes:
a first LBT unit, configured to perform LBT for a channel in a transmission direction of a first SSB of the at least two SSBs;
a second LBT unit, configured to perform LBT for a channel in a transmission direction of a second SSB of the at least two SSBs by using an OFDM symbol of the first SSB if the channel in the transmission direction of the first SSB is detected as busy;

a third LBT unit, configured to transmit the first SSB in the OFDM symbol of the first SSB and not transmit the second SSB in the OFDM symbol of the second SSB if the channel in the transmission direction of the first SSB is detected as idle, wherein the second SSB is after the first SSB and is adjacent to the first SSB.

Further, the LBT module 1501 further includes:

a fourth LBT unit, configured to perform LBT for a channel in a transmission direction of a third SSB of the at least two SSBs in the OFDM symbol of the second SSB if the channel in the transmission direction of the first SSB is detected as idle, wherein the third SSB is after the second SSB and is adjacent to the second SSB.

Optionally, the network device does not transmit an index of an SSB transmitted by the network device.

Further, that the network device does not transmit the index of the SSB transmitted by the network device is implemented in one of following manners:

RMSI transmitted by the network device does not carry the index of the SSB transmitted by the network device;

an IE associated with the index of the SSB transmitted by the network device is not included in a protocol.

It is noted, the network device embodiment is a network device corresponding to the foregoing signal transmission method applied to a network device side, and all implementations of the method embodiment are applicable to the network device embodiment and may achieve the same technical effects.

The present disclosure further provides, in an embodiment, a network device, including a memory, a processor and a computer program stored in the memory and configured to be executed by the processor, wherein the processor is configured to execute the computer program to implement various processes of the foregoing signal transmission method embodiment applied to a network device, and may achieve the same technical effects. To avoid redundancy, a detailed description is omitted herein.

The present disclosure further provides, in an embodiment, a computer readable storage medium storing therein a computer program, wherein the computer program is configured to be executed by a processor, to implement various processes of the foregoing signal transmission method embodiment applied to a network device, and may achieve the same technical effects. To avoid repetition, a detailed description is omitted herein. The computer readable storage medium is, e.g., read-only memory (Read-Only Memory, ROM), random access memory (Random Access Memory, RAM), magnetic disk, optical disc or the like.

Figure 16:
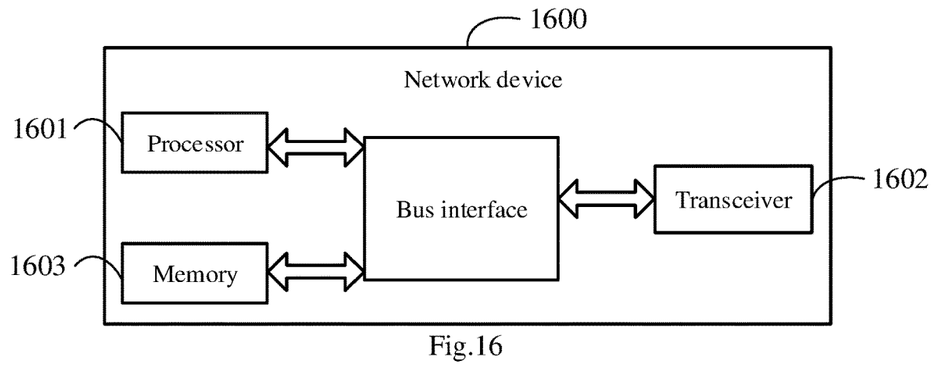
FIG. 16 is a structure diagram of a network device according to an embodiment of the present disclosure.

FIG. 16 is a structure diagram of a network device according to an embodiment of the present disclosure. The network device may implement details of the foregoing signal transmission method applied to a network device side and achieve the same effects. As shown in FIG. 16, the network device 1600 includes: a processor 1601, a transceiver 1602, a memory 1603 and a bus interface.

The processor 1601 is configured to read program in the memory 1603, to implement the following process:

performing LBT for a channel in an SSB transmission direction before a transmission of an SSB in an unlicensed band; and transmitting the SSB through the transceiver 1602 when the channel is detected as idle.

In FIG. 16, a bus architecture may include any number of interconnected buses and bridges, and connects various circuits including one or more processors represented by the processor 1601 and memory represented by the first memory 1603. The bus architecture may also connect various other circuits such as peripherals, voltage regulators and power management circuits, which is well known in the art. Therefore, a detailed description thereof is omitted herein. The bus interface provides interfaces. The transceiver 1602 may be plural elements, i.e., including a transmitter and a receiver, to allow for communication with various other apparatuses on the transmission medium.

The processor 1601 is responsible for managing the bus architecture and normal operation, and the memory 1603 may store the data being used by the processor 1601 during operation.

Optionally, the processor 1601 is configured to read program in the memory 1603, to implement the following process:

performing LBT for a channel in the SSB transmission direction for a target duration, wherein the target duration is determined in one of following manners:

the target duration is equal to a CCA duration; or the target duration is acquired according to following formula: target duration=defer duration+random (0,M)×N, wherein M is a maximum number of CCAs and a positive integer less than 127, N is a CCA duration, and random (0, M) is a random number between 0 and M.

Optionally, the processor 1601 is configured to read program in the memory 1603, to implement the following process:

performing LBT for a channel in the SSB transmission direction by using a gap OFDM symbol, wherein the gap OFDM symbol is between two adjacent SSBs.

Optionally, if there are at least two consecutive SSBs, the processor 1601 is configured to read program in the memory 1603, to implement the following process:

performing LBT for a channel in a transmission direction of a first SSB of the at least two SSBs;

performing LBT for a channel in a transmission direction of a second SSB of the at least two SSBs by using an OFDM symbol of the first SSB if the channel in the transmission direction of the first SSB is detected as busy;

transmitting the first SSB in the OFDM symbol of the first SSB and not transmitting the second SSB in the OFDM symbol of the second SSB if the channel in the transmission direction of the first SSB is detected as idle, wherein the second SSB is after the first SSB and is adjacent to the first SSB.

Optionally, the processor 1601 is configured to read program in the memory 1603, to implement the following process:

performing LBT for a channel in a transmission direction of a third SSB of the at least two SSBs in the OFDM symbol of the second SSB if the channel in the transmission direction of the first SSB is detected as idle, wherein the third SSB is after the second SSB and is adjacent to the second SSB.

Further, the network device does not transmit an index of an SSB transmitted by the network device.

Specifically, that the network device does not transmit the index of the SSB transmitted by the network device is implemented in one of following manners:

RMSI transmitted by the network device does not carry the index of the SSB transmitted by the network device;

an IE associated with the index of the SSB transmitted by the network device is not included in a protocol.

The network device may be a base transceiver station (Base Transceiver Station, BTS) in the global system of mobile communication (Global System of Mobile communication, GSM) or the code division multiple access (Code Division Multiple Access, CDMA), a nodeB (NodeB, NB) in the wideband code division multiple access (Wideband Code Division Multiple Access, WCDMA), an evolutional node B (Evolutional Node B, eNB or eNodeB) in LTE, a relay station or an access point, or a base station in future 5G network, or the like, which is not limited herein.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk or an optical disc) and includes several instructions configured to be executed by a terminal (such as a handset, a computer, a server, an air conditioner or a network device) to perform the method according to the embodiments of the present disclosure.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A signal transmission method, which is performed by a network device, comprising:
performing listen before talk (LBT) for a channel in a synchronization signal block (SSB) transmission direction before a transmission of an SSB in an unlicensed band; and
transmitting the SSB when the channel is detected as idle,
wherein, when there are at least two consecutive SSBs scheduled to be transmitted, the performing LBT for a channel in the SSB transmission direction comprises:
performing LBT for a channel in a first transmission direction of a first SSB of the at least two SSBs, transmitting the first SSB in an orthogonal frequency division multiplex (OFDM) symbol of the first SSB and not transmitting a second SSB in a second transmission direction in an OFDM symbol of the second SSB when the channel in the transmission direction of the first SSB is detected as idle; or
performing LBT for a channel in the second transmission direction of the second SSB of the at least two SSBs in the OFDM symbol of the first SSB when the channel in the first transmission direction of the first SSB is detected as busy; and
performing LBT for a channel in a third transmission direction of a third SSB of the at least two SSBs in the OFDM symbol of the second SSB when the channel in the first transmission direction of the first SSB is detected as idle,
wherein the second SSB is after the first SSB and is adjacent to the first SSB, the third SSB is after the second SSB and is adjacent to the second SSB, and the transmission direction of the first SSB is substantially different from the transmission direction of the second SSB.

2. The signal transmission method according to claim 1, wherein the performing LBT for a channel in the SSB transmission direction comprises:
performing LBT for a channel in the SSB transmission direction for a target duration,
wherein the target duration is determined in one of following manners:
the target duration is equal to a clear channel assessment (CCA) duration; or
the target duration is acquired according to the following formula: target duration=defer duration+random $(0,M) \times N$, wherein M is a maximum number of CCAs and a positive integer less than 127, N is a CCA duration, and random $(0,M)$ is a random number between 0 and M.

3. The signal transmission method according to claim 1, wherein the performing LBT for a channel in the SSB transmission direction comprises:
performing LBT for a channel in the SSB transmission direction in a gap OFDM symbol, wherein the gap OFDM symbol is between two adjacent SSBs.

4. The signal transmission method according to claim 1, wherein the network device does not transmit an index of an SSB transmitted by the network device.

5. The signal transmission method according to claim 4, wherein that the network device does not transmit the index of the SSB transmitted by the network device is implemented in one of following manners:
remaining minimum system information (RMSI) transmitted by the network device does not carry the index of the SSB transmitted by the network device; and
an information element (IE) associated with the index of the SSB transmitted by the network device is not included in a technical specification.

6. A network device, comprising a memory, a processor and a computer program stored in the memory and configured to be executed by the processor, wherein the processor is configured to execute the computer program, to implement steps of a signal transmission method, applied to the network device, comprising:
performing listen before talk (LBT) for a channel in a synchronization signal block (SSB) transmission direction before a transmission of an SSB in an unlicensed band; and
transmitting the SSB when the channel is detected as idle,
wherein, when there are at least two consecutive SSBs scheduled to be transmitted, the performing LBT for a channel in the SSB transmission direction comprises:
performing LBT for a channel in a first transmission direction of a first SSB of the at least two SSBs, transmitting the first SSB in an orthogonal frequency division multiplex (OFDM) symbol of the first SSB and not transmitting a second SSB in an orthogonal frequency division multiplex (OFDM) symbol of the second SSB when the channel in the transmission direction of the first SSB is detected as idle; or performing LBT for a channel in the second transmission direction of the second SSB of the at least two SSBs in the OFDM symbol of the first SSB when the channel in the first transmission direction of the first SSB is detected as busy; and performing LBT for a channel in a third transmission direction of a third SSB of the at least two SSBs in the OFDM symbol of the second SSB when the channel in the first transmission direction of the first SSB is detected as idle, wherein the second SSB is after the first SSB and is adjacent to the first SSB, the third SSB is after the second SSB and is adjacent to the second SSB, and the transmission direction of the first SSB is substantially different from the transmission direction of the second SSB.

7. The network device according to claim 6, wherein the performing LBT for a channel in the SSB transmission direction comprises:

performing LBT for a channel in the SSB transmission direction for a target duration, wherein the target duration is determined in one of following manners:

the target duration is equal to a clear channel assessment (CCA) duration; or the target duration is acquired according to the following formula: target duration=defer duration+random (0,M)×N, wherein M is a maximum number of CCAs and a positive integer less than 127, N is a CCA duration, and random (0,M) is a random number between 0 and M.

8. The network device according to claim 6, wherein the performing LBT for a channel in the SSB transmission direction comprises:

performing LBT for a channel in the SSB transmission direction in a gap OFDM symbol, wherein the gap OFDM symbol is between two adjacent SSBs.

9. The network device according to claim 6, wherein the network device does not transmit an index of an SSB transmitted by the network device.

10. The network device according to claim 9, wherein that the network device does not transmit the index of the SSB transmitted by the network device is implemented in one of following manners:

remaining minimum system information (RMSI) transmitted by the network device does not carry the index of the SSB transmitted by the network device; and an information element (IE) associated with the index of the SSB transmitted by the network device is not included in a technical specification.

11. A non-transitory computer readable storage medium storing therein a computer program, wherein the computer program is configured to be executed by a processor, to implement steps of a signal transmission method, performed by a network device, comprising:

performing listen before talk (LBT) for a channel in a synchronization signal block (SSB) transmission direction before a transmission of an SSB in an unlicensed band; and transmitting the SSB when the channel is detected as idle, wherein, when there are at least two consecutive SSBs scheduled to be transmitted, the performing LBT for a channel in the SSB transmission direction comprises:

performing LBT for a channel in a first transmission direction of a first SSB of the at least two SSBs, transmitting the first SSB in an orthogonal frequency division multiplex (OFDM) symbol of the first SSB and not transmitting a second SSB in an orthogonal frequency division multiplex (OFDM) symbol of the second SSB when the channel in the transmission direction of the first SSB is detected as idle; or performing LBT for a channel in the second transmission direction of the second SSB of the at least two SSBs in the OFDM symbol of the first SSB when the channel in the first transmission direction of the first SSB is detected as busy; and performing LBT for a channel in a third transmission direction of a third SSB of the at least two SSBs in the OFDM symbol of the second SSB when the channel in the first transmission direction of the first SSB is detected as idle, wherein the second SSB is after the first SSB and is adjacent to the first SSB, the third SSB is after the second SSB and is adjacent to the second SSB, and the transmission direction of the first SSB is substantially different from the transmission direction of the second SSB.

12. The non-transitory computer readable storage medium according to claim 11, wherein the performing LBT for a channel in the SSB transmission direction comprises:

performing LBT for a channel in the SSB transmission direction for a target duration, wherein the target duration is determined in one of following manners:

the target duration is equal to a clear channel assessment (CCA) duration; or the target duration is acquired according to the following formula: target duration=defer duration+random (0,M)×N, wherein M is a maximum number of CCAs and a positive integer less than 127, N is a CCA duration, and random (0,M) is a random number between 0 and M.

13. The non-transitory computer readable storage medium according to claim 11, wherein the performing LBT for a channel in the SSB transmission direction comprises:

performing LBT for a channel in the SSB transmission direction in a gap OFDM symbol, wherein the gap OFDM symbol is between two adjacent SSBs.

14. The non-transitory computer readable storage medium according to claim 11, wherein the network device does not transmit an index of an SSB transmitted by the network device.

15. The non-transitory computer readable storage medium according to claim 14, wherein that the network device does not transmit the index of the SSB transmitted by the network device is implemented in one of following manners:

remaining minimum system information (RMSI) transmitted by the network device does not carry the index of the SSB transmitted by the network device; and an information element (IE) associated with the index of the SSB transmitted by the network device is not included in a technical specification.

* * * * *